A. L. BENNER.
ARMORED TREAD FOR TIRES.
APPLICATION FILED JULY 7, 1919.
1,375,349. Patented Apr. 19, 1921.
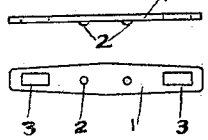
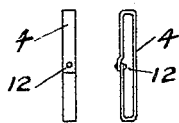
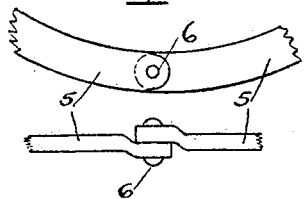
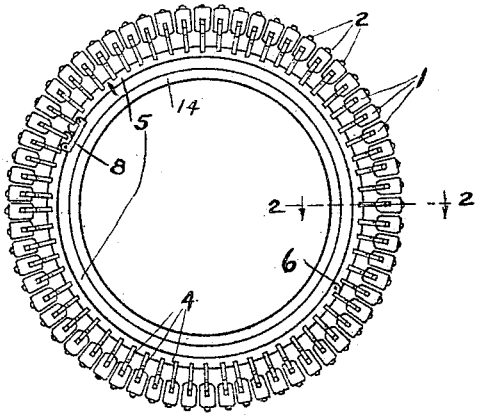
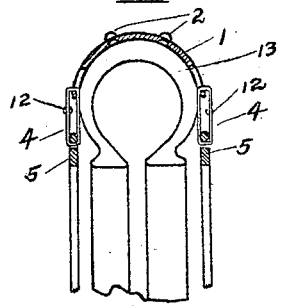
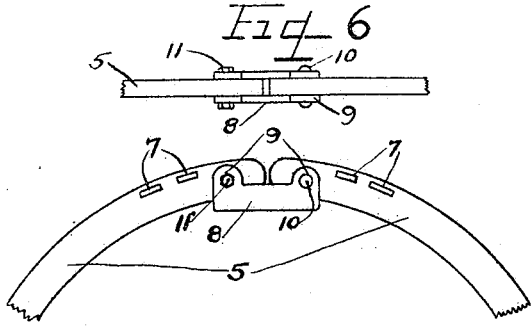
Witnesses
Inventor
ARTHUR L. BENNER

UNITED STATES PATENT OFFICE.

ARTHUR L. BENNER, OF ELGIN, ILLINOIS.

ARMORED TREAD FOR TIRES.

1,375,349.

Specification of Letters Patent.  Patented Apr. 19, 1921.

Application filed July 7, 1919. Serial No. 308,999.

*To all whom it may concern:*

Be it known that I, ARTHUR L. BENNER, a citizen of the United States, and a resident of the city of Elgin, in the county of Kane and State of Illinois, have invented certain new and useful Improvements in Armored Treads for Tires; and I do hereby declare that the following is a full, clear, and exact description of the same, reference being had to the accompanying drawings, and to the numerals of reference marked thereon, which form a part of this specification.

This invention relates to detachable treads and non-skid devices and although not restricted to such use, is particularly adapted for use in connection with pneumatic automobile tires.

Heretofore, it has been customary to employ chains for preventing skidding. Chains however, do not protect the tires from wear or from cuts or punctures by sharp objects on the road. Further, although it has been suggested to embed small steel plates in tire treads for the prevention of punctures, it has been found that the friction produced by the expansion and contraction of the material of the tire over the surface of the steel plates produces sufficient heat to destroy the life of the tread material.

It is an object therefore of the present invention to provide a detachable armored tread which will act not only to reduce the wear on the tire but also largely if not entirely, to prevent puncturing of the tire without producing such heat in the tire as will destroy its material.

Other and further important objects of this invention will be apparent from the disclosure in the specification and the accompanying drawings.

The invention (in a preferred form) is illustrated in the drawings and hereafter more fully described.

On the drawings:

Figure 1 is a side elevation of an automobile tire and rim provided with a detachable tread device embodying the present improvements.

Fig. 2 is a section on the line 2—2 of Fig. 1.

Fig. 3 shows one of the sections of the tread in side elevation and in plan.

Fig. 4 shows one of the links which connect the tread members to the supporting ring in side elevation and plan.

Fig. 5 shows the hinged portion of the supporting ring in side elevation and plan.

Fig. 6 shows the link for connecting the ends of the ring in plan and side elevation.

As shown on the drawings:

The tread device comprises a series of flexible strips or plates formed of suitable resistant material preferably sheet steel. Each of these plates is provided with studs 2 to aid the wheels in gripping the ground. These studs may conveniently take the form of rivets as shown in Fig. 2 having projecting heads on the outer sides of the plates but arranged so that their inner faces are flush with the inner surfaces of the plates to avoid injury to the tire 13 particularly since detachable treads are apt to creep around the wheel during use unless secured to the spokes in some way.

Each end of each plate is provided with an aperture 3 for the passage of a link 4 by which the ends of the plates are connected to rings 5 for holding the plates in spaced relation and also for holding the plates in contact with the outer surface of the tire. The rings 5 are similarly formed with a series of slots 7 for passage of the links 4. Each link 4 is conveniently formed from a strip of steel which is passed through the apertures 3 and 7 and then united at its ends by a rivet 12. The rings 5 are preferably formed in two semicircular parts hinged together at 6 to enable the device to be removed from or applied to the tire.

The free ends of the two halves of each ring may be detachably secured together in any convenient way. In the construction shown this is obtained by means of a trough shaped part 8 having upstanding lugs 9 for the reception of a rivet 10 and bolt 11. It will be seen that by loosening the nut of the bolt 11, and then removing the bolt, the two halves of the ring 5 may be moved apart so as to detach the device from the wheels 14.

I am aware that various details of construction may be varied through a wide range without departing from the principles of this invention and I therefore do not purpose limiting the patent granted otherwise than necessitated by the prior art.

I claim as my invention:

1. In a means for holding tire armor onto a wheel, a pair of rings, one of said rings being comprised of two parts hinged together and a link pivotally connected to the unhinged end of one of said parts and bolted to the other part.

2. In a means for holding tire armor onto a wheel, a pair of rings, one of said rings being composed of two parts hinged together and a trough shaped link pivoted to one of said members near the unhinged end thereof with the floor of the trough toward the inside of the ring, lugs on the walls of said trough embracing the other part of said ring and a bolt extending through said lugs and said last named part.

In testimony whereof I have hereunto subscribed my name in the presence of two subscribing witnesses.

ARTHUR L. BENNER.

Witnesses:
EARL M. HARDINE,
CHARLES W. HILLS, Jr.